United States Patent [19]

Bergstrom

[11] Patent Number: 4,653,717

[45] Date of Patent: Mar. 31, 1987

[54] COLLAPSIBLE LIGHTWEIGHT AND RIGIDLY COMPACT MULTIPLE PROJECTOR STAND

[75] Inventor: Darryl K. Bergstrom, Thousand Oaks, Calif.

[73] Assignee: Daedalus Industries, Inc., Westlake Village, Calif.

[21] Appl. No.: 726,674

[22] Filed: Apr. 24, 1985

[51] Int. Cl.4 ............................................. F16M 11/12
[52] U.S. Cl. ...................................... 248/664; 211/13; 211/175; 108/4; 108/1
[58] Field of Search ............... 248/664, 639, 121, 122, 248/133, 179, 180; 211/175, 13, 168, 85, 186; 353/94; 108/4, 1

[56] References Cited

U.S. PATENT DOCUMENTS

| | | | |
|---|---|---|---|
| 399,345 | 3/1889 | Poehlman | 248/179 |
| 505,879 | 10/1893 | Graydon | 353/94 |
| 1,396,445 | 11/1921 | Loudon | 108/1 X |
| 1,489,934 | 4/1924 | Eklund | 248/122 X |
| 2,297,358 | 9/1942 | Kramer | 211/85 |
| 3,170,418 | 2/1965 | Gruenstein | 211/186 X |
| 3,515,015 | 6/1970 | Gilbert | 248/179 X |
| 4,148,453 | 4/1979 | Brantly | 211/13 X |
| 4,526,337 | 1/1985 | Viasmensky | 248/639 |

FOREIGN PATENT DOCUMENTS 8965 of 1914 United Kingdom ................... 108/4

*Primary Examiner*—Ramon S. Britts
*Assistant Examiner*—Blair M. Johnson
*Attorney, Agent, or Firm*—William H. Maxwell

[57] ABSTRACT

A light weight inherently stable and rigid projector stand for multi-axis projection of images onto a common screen by magazine loaded slide projectors, maximizing close proximity of the projection axes, with improved magazine access, and direct support of each projector for pitch axis and roll axis and yaw axis adjustment, the stand being also adjustable for pitch, roll and yaw and unison adjustment of the multiplicity of projection axes.

26 Claims, 12 Drawing Figures

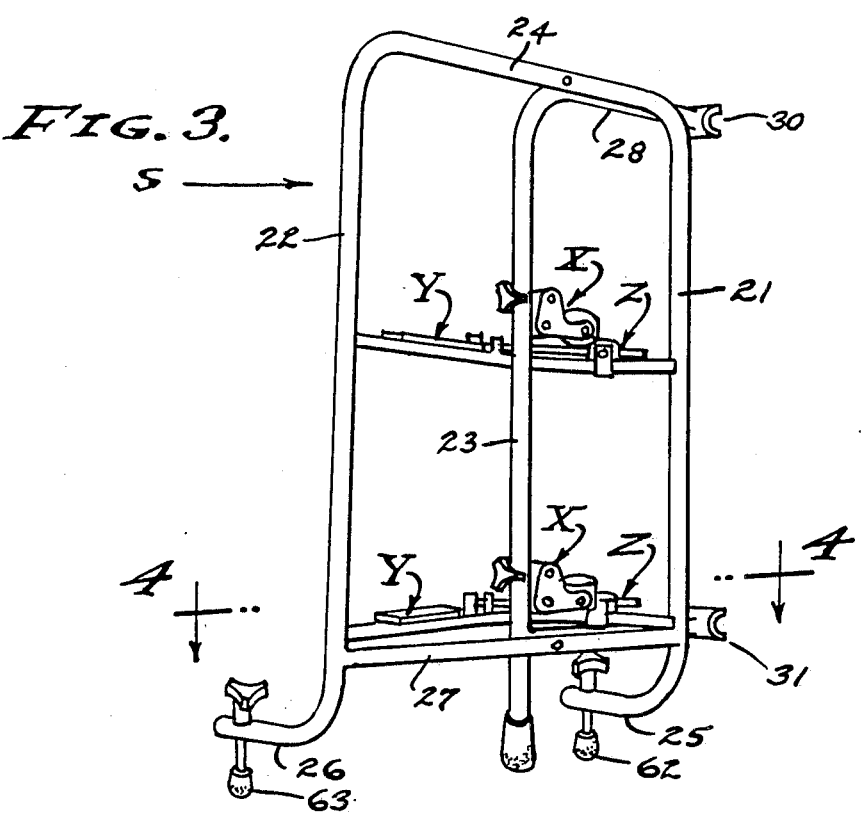
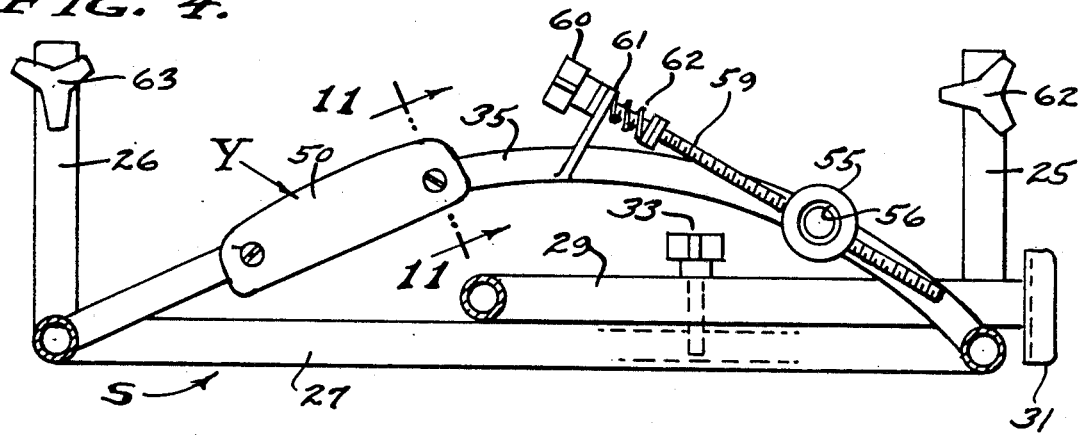
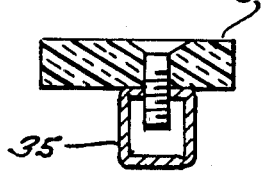
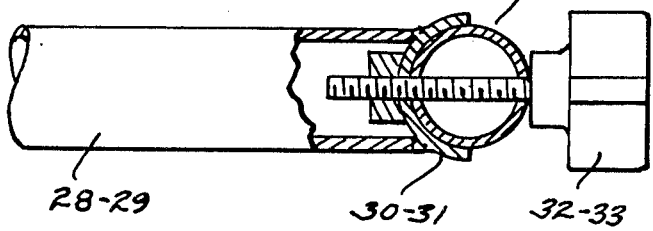

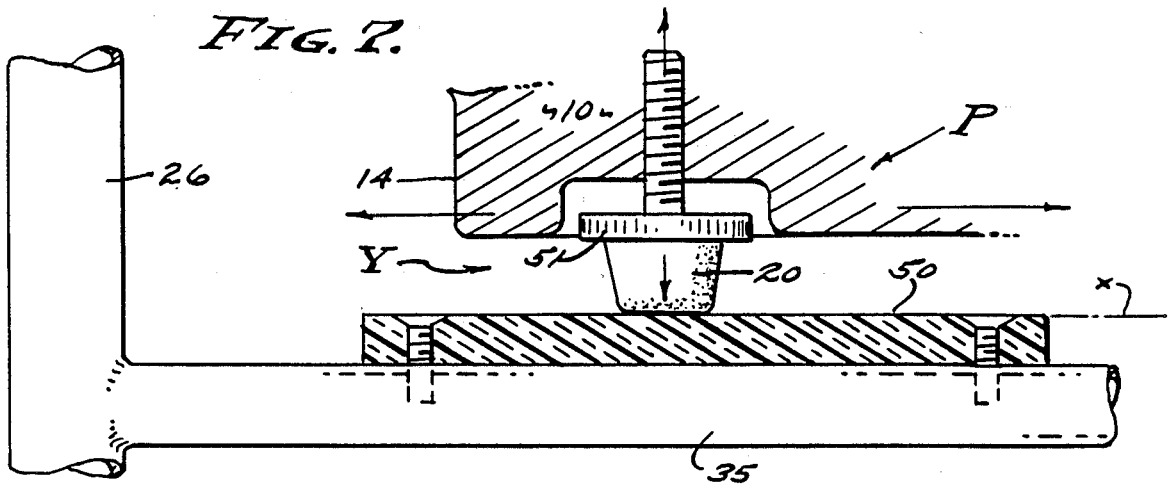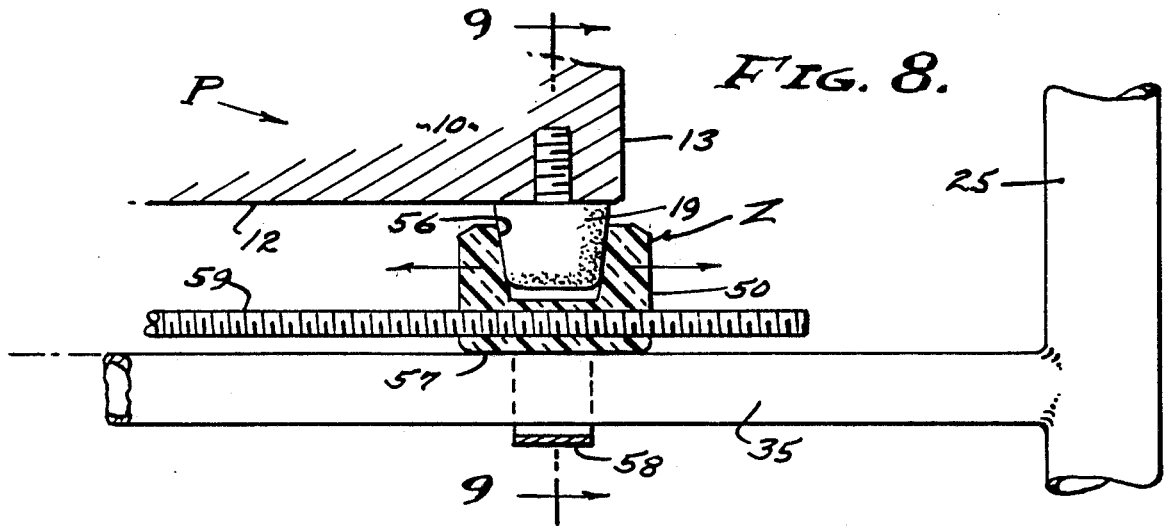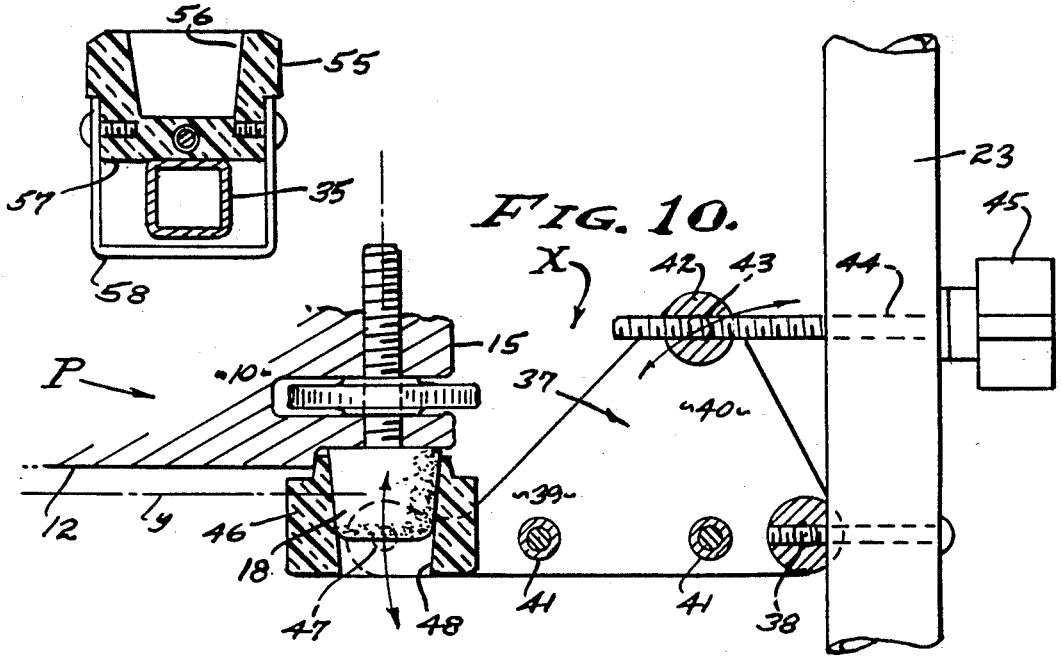

COLLAPSIBLE LIGHTWEIGHT AND RIGIDLY COMPACT MULTIPLE PROJECTOR STAND

BACKGROUND OF THE INVENTION

Multi-Image projection onto a common screen is widely practiced, using a plurality of slide projectors of like configuration. The projectors employed are electrically automated and each is self contained and characterized by a magazine containing a large number of transparencies or slides to be projected onto the screen; a typical configuration being that of the carousel type wherein a circular magazine is superimposed upon a rectangular box-shaped housing. The projector housing is more or less square in plan view and shallow in elevation, and conventionally rests upon three feet which normally support the projector upon a flat surface. A projection lens opens from the front and one side of the housing on an axis fixed therewith, and the legs are vertically adjustable to vary the pitch and roll attitude of the unit; yaw attitude being varied by bodily turning the projector unit. It is to be understood that such projectors include the various other features and means necessary thereto, such as a light source, cooling, and electro-mechanical automation means, all of which is state of the art.

Heretofore, projector stands of the type under consideration have provided individually adjustable platforms upon which the aforementioned typical projector rests, the said platform or like framework being adjustable as to pitch, roll and yaw attitude. The required rigid support upon individually adjustable platform-frames is not only space consuming but is weighty and costly. It is a general object of this invention to eliminate supporting platforms or frames of the prior art and to adjustably support the projectors directly upon a stand by utilizing the adjustable leg features common to such projectors for varying pitch and roll attitudes. With the present invention, securement of the projectors to the stand is by means of pitch adjustment means, by roll adjustment means, and by yaw adjustment means, as will be described. Each of these three adjustment means is also a support means, the primary and only support of the projector upon the stand.

State of the art projector stands are characteristically comprised of a heavy base with columnar supports at each of the four corners, and within which there is a bay defined for each projector by a supporting platform or frame which is itself adjustable as to pitch, roll and yaw attitudes. The original adjustment legs of the projector play no part in the adjustment of the platform-frame, the stand and platform-frame being resorted to for all adjustment. The integration of prior art platform-frame and stand is complicated, weigthy and costly; it is also conducive to looseness and play (backlash) and therefore with loss of accuracy in the ultimate optical projection of images onto the screen. Accordingly, it is an object of this invention to greatly simplify the stand per se, by reducing it to a two legged ladder stabilized by a third leg. A feature of this invention is that each of the three legs accomodates a support adjustment means; one for pitch, one for roll, and one for yaw. In practice, there is a spreader for each bay that accomodates a projector, the two legs of the ladder and said third leg being of light weight tube form each carrying one of the three support adjustment means, for pitch, roll and yaw control. It is also an object of this invention that this three legged ladder-like stand be collapsible for storage and transport within a minimum of space.

Prior art pitch control resorts to forward inclined adjustment of a platform or frame that in turn supports the projector. It is an object of this invention to directly support an original front leg of the projector from a column of the stand, whereby pitch adjustment is attained. Pitch adjustment of the original and typical projector is attained by vertical screw adjustment of a front leg offset to one side of the optical projection axis; in which case the pitch control support means is a fixed bracket carried by a front leg and having a socket to snugly receive a foot of said projector leg. When pitch control is non existant or awkward to use at the said front leg, the pitch control support means is a vertically adjustable bracket carried by said front leg to control the elevation or pitch attitude, the fulcrum therefor existing on an axis line extending between spaced rear leg supports. The receiving socket of the pitch adjustment support means is little or no deeper than the leg-foot, there being no structure beneath this level; no platform or frame.

Prior art roll control resorts to a side to side rocking adjustment of a platform or frame that in turn supports the projector. It is an object of this invention to directly support original and typical rear legs of the projector from spaced columns of the stand, whereby roll adjustment is attained. Roll adjustment of the original and typical projector is attained by vertical screw adjustment at one rear side leg, the other rear side leg remaining fixed or stationary in height. This original typical roll adjustment is a refinement of the projector and is utilized herein through sliding engagement of the leg foot upon a horizontal shelf carried by the spreader that defines the projector bay involved. There is no receiving socket, since the one rear leg foot slides freely upon the shelf. The said one rear leg and supporting shelf and spreader are all at the far rear of the projector and stand therefor; presenting no encumberance beneath the projector being adjustably supported.

Prior art yaw control resorts to a vertical axis turning adjustment of a platform or frame that in turn supports the projector. It is an object of this invention to directly support original and typical rear legs of the projector from spaced columns of the stand, whereby yaw adjustment is attained. There is no yaw adjustment per se in the original typical projector, as it is manually positioned in this respect. Yaw adjustment of the original typical projector is attained by providing lateral screw adjustment of a carriage slideably supported upon the aforesaid spreader to move restrictedly in an arcuate path about the pivot point established by the first mentioned pitch control socket support. Accordingly, the yaw control support means is characterized by a laterally adjustable socket to snugly receive a foot of said projector leg, one of the original typical rear legs of the projector and particularly the fixed or stationary leg at the side opposite the aforementioned roll adjustment leg. The spreader forms a ways upon which the adjusted carriage slides, the said other rear leg and supporting spreader being at the far rear of the projector and stand therefor; presenting no encumberance beneath the projector being adjustably supported.

It is an object of this invention to reserve maximum vertical clearance beneath superimposed projectors, by employing the combination of the aforementioned pitch adjustment support means, the roll adjustment support means and the yaw adjustment support means. By employing these combined means as shown and described, there is nothing between the bottom of one projector and the top of the next underlying projector, and as a result space is maximized and vertical optical centers between the projectors is reduced and minimized as much as is possible commensurate with access to the carousel magazine (as it is shown herein). Accordingly, "keystoning" is minimized, and "perspective control lenses" are optimized. It is also an object that the combined attitude adjustments as disclosed herein are orthogonally related, at right angles of movement with respect to each other.

It is another object of this invention to provide the aforesaid pitch, roll and yaw adjustment-support means integrated in a stand adapted to accomodate a multiplicity of original typical slide projectors, one closely above the other and closely side by side; without disturbing accessibility for magazine replacement and with all active features and controls of the projectors exposed for operation. It is still another object of this invention to provide for unison adjustment of the stand and its multiplicity of projectors, as to pitch, roll and yaw. It is still yet another object of this invention to provide for accuracy in the disposition of multiple projection axes, by providing an anti-deflection structure having inherent rigidity, with self lubricating contacts, and anti-backlash micro-screw adjustment means.

SUMMARY OF THE INVENTION

This invention relates to slide projection using a multiplicity of projectors, whereby transparencies can be superimposed, overlaid, shown side by side, above and below, and blended or shown in timed or any such desired manner or relationship, as circumstances require. In order to accomplish such showings, multiple still projectors are employed one above the other, two or three or more high, and side by side. The placement of projection axes is critical and individual adjustment of each projector as to pitch, roll and yaw is a necessity. Also, minimum separation and/or close operative proximity of one projector to another, and in a cluster, is required with access to each projector for its service. With these requirements in mind, the present invention provides a Collapsible Lightweight And Rigidly Compact Multiple Projector Stand that is inherently rigid and accurately places each projector on a pricise axis relative to the other projector or other projectors to which it is related during a showing, all projectors being individually adjustable about x, y and z axes of pitch, roll and yaw respectively. A feature of this invention is that cumbersome over engineered prior art structures are eliminated and replaced with a simple lightweight stand structure to which the multiplicity of original typical and unmodified projectors are directly applied through individually adjustable pitch control, roll control and yaw control support means. These three means operate on the aforesaid x, y and z axes, and do so with inherent accuracy as each function is by anti-backlash means. This stand is basically three legged and of ladder-like construction, with a third stabilizing leg that is moveable or removeable with respect to the ladder form for compact storage and/or transport configuration.

The foregoing and various other objects and features of this invention will be apparent and fully understood from the following detailed description of the typical preferred forms and applications thereof, throughout which description reference is made to the accompanying drawings.

FIG. 3 is a perspective view showing the stand of FIG. 1 in a collapsed condition.

FIG. 4 is an enlarged transverse plan section taken as indicated by line 4—4 on FIG. 3.

FIG. 7 is an enlarged detailed fragmentary view taken as indicated by line 7—7 on FIG. 5.

FIG. 8 is an enlarged detailed fragmentary view taken as indicated by line 8—8 on FIG. 5.

FIG. 9 is an enlarged detailed fragmentary view taken as indicated by line 9—9 on FIG. 8 with the projector removed.

FIG. 10 is an enlarged detailed fragmentary view taken as indicated by line 10—10 on FIG. 5.

FIG. 11 is an enlarged detailed section taken as indicated by line 11—11 on FIG. 4.

Figure 5:
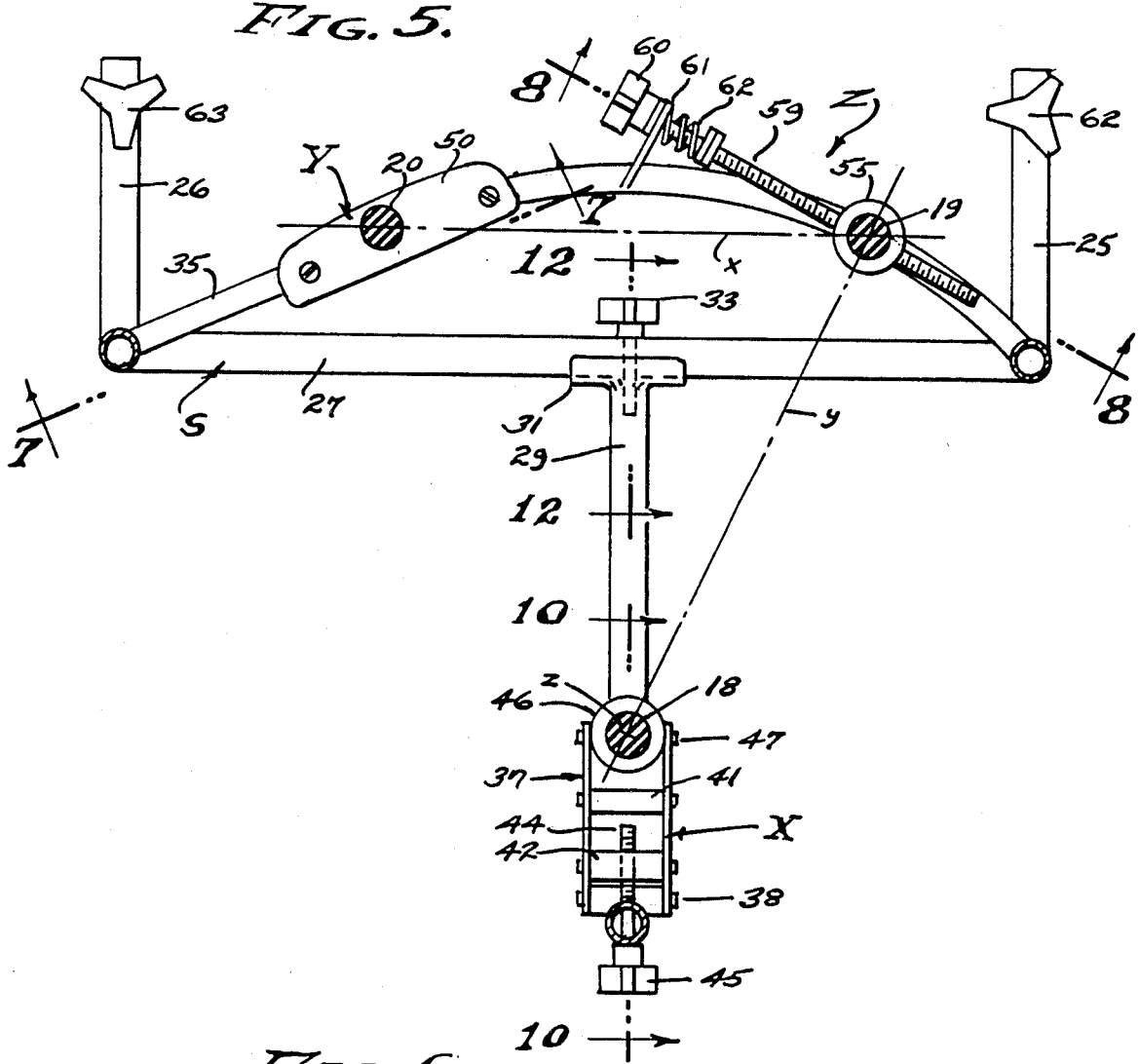
FIG. 5 is an enlarged transverse plan section taken as idicated by line 5—5 on FIG. 1.

And FIG. 12 is an enlarged detailed fragmentary view taken as indicated by line 12—12 on FIG. 5.

PREFERRED EMBODIMENT

The projectors P are to be considered as alike and comprised of a housing 10 of rectangular box-like configuration substantially square in plan form and shallow in elevation; and characterized by a flat top 11, a flat bottom 12, and flat opposite sides 13 and 14, and flat front 15 and back sides 16. The features 11–16 can vary widely depending upon operative requirements and the addition of accessories and controls etc. However, a characteristic feature is the opening of a projection lens 17 from the front 15 on a projection axis p, typically at one side of the housing 10, and with the controls at the right side (facing forward). Thus, the projector can be said to be asymetrical with its parts and elements placed to optimum advantage as circumstances require; with controls to the right side, with power and cables connected to the back side, and with the lens 17 exposed through the front side. In the particular projectors shown, the top 11 is devoted to the accomodation of a circular magazine M of flattened-drum configuration and which is removeably received at the top of the projector where it dispenses and retrieves the slide transparencies (not shown).

In accordance with this invention, the like projectors P are self supported by three legs 18, 19 and 20; a front leg 18 for pitch adjustment about the x axis established by the surface support of a pair of rear legs 19 and 20; a rear leg 20 for roll adjustment about the y axis established by the surface support of front leg 18 and the opposite side leg 19. It will be observed that the axis y is angularly disposed to the projection axis p, however this discrepancy is a feature that is accepted and not objected to. There is no yaw adjustment as such in these original typical projectors which are used unmodified herein, except that they can be bodily moved for correcting this yaw attitude. As will be described this invention provides yaw adjustment on axis z, thereby avoiding manipulation of the projector in this respect.

The stand S is comprised of a ladder-back having a pair of spaced parallel and laterally disposed side legs 21 and 22, and a front leg 23 spaced parallel thereto and forward of the side legs. The ladder-back side legs are integrally fabricated separately from the front leg 23, for moveable and/or removeable placement whereby the stand is readily and effectively collapsed. In practice, the two fabrications are of light weight tubing integrally welded with rigid spreaders and struts as will be described.

The ladder-back pair of side legs 21 and 22 are integrally joined by the continuous tube thereof in a horizontal header 24, there being rearwardly extending heel portions 25 and 26 projecting continuously from the bottom of each leg. A horizontal bottom spreader 27 of like tube extends rigidly between the the lower portions of the legs and welded thereto forming a basic rectangle of rigid form within which a multiplicity of projectors P can be accomodated.

The front leg 23 is integrally joined to top and bottom struts 28 and 29 that are horizontally disposed in the planes of the header 24 and bottom spreader 27. The top strut 28 is a tube continuation of the leg 23 while the strut 29 is a like tube welded thereto. Each struct 28 and 29 terminates in a saddle 30 and 31 which fit the front sides of the header 24 and bottom spreader 27, where they are drawn into tight engagement by a winged draw bolt 32 and 33 passed through the header and spreader and threadedly engaged into the ends of the struts respectively. When the draw bolts 32 and 33 are removed from working position, the front leg 23 and appended struts are free as a unit to be arranged in flat relation to the ladder-back side legs 21 and 22, where the said draw bolts are again used for securement in a collapsed storage and/or transport condition.

In accordance with this invention, each bay of the ladder-back configuration of the side legs 21 and 22 is an accomodation for a projector P, each bay being defined by a support spreader 35. Accordingly, a two bay stand S has two spaced horizontally disposed support spreaders 35 extending between the side legs 21 and 22, while a three bay stand S' has three such spreaders 35 (not shown), etc. In practice, the support spreaders 35 are vertically spaced so that there is working clearance above the magazine M below each superimposed projector P, as shown. The header 24 is so placed, as is the bottom spreader 27 also. The vertically disposed and parallel legs 21, 22 and 23 are each related to an adjustment function of pitch, roll or yaw, the leg 23 carrying a pitch adjustment support means X, the support spreader 35 at leg 22 carrying a roll adjustment support means Y, and the support spreader 35 at leg 21 carrying a yaw adjustment support means Z, all of which will now be described.

There is a transverse pitch adjustment axis means X established by support of the two rear projector legs 19 and 20 by the spreader 35; there is a longitudinal roll adjustment axis means Y established by support of the projector leg 19 by the spreader 35 at stand leg 21 and by support of the front projector leg 18 at the stand leg 23; and there is a vertical yaw adjustment axis means Z established by support of the projector leg 18 at the stand leg 23. The axes X, Y and Z are each established by the support relationship of the projector legs 18, 19 and 20 with the adjustment support means X, Y and Z.

Referring now to the pitch adjustment support means X, there is a lift bracket 37 to raise and to lower the front projector leg 18 for rotation of the projector about the axis x disposed between the side legs 21 and 22. The bracket 37 is preferably a first class lever of bellcrank form pivoted on transverse horizontally disposed trunnions 38 and with a rearwardly extending support arm 39 and an upstanding power arm 40. The trunnions 38 are in the form of a block rigid with front leg 23, and the bracket is comprised of a pair of identical plates held in spaced parallel relation by one or more spacers 41. A draw bar 42 is carried by trunnions 43 at the upper end of the power arm 40, and through which an adjustment screw 44 is threadedly engaged. The screw 44 has a control knob 45 that bears upon the front of leg 23 through an anti-friction washer, whereby the power arm 40 is drawn forward for integral movement of the support arm 39 to raise and lower. In accordance with this invention there is a socket 46 carried by trunnions 47 at the rear end of the support arm 39, to snugly receive and carry the front leg 18 of the projector. The axis of trunnions 47 is transverse and horizontal, and parallel with the trunnions 38 and trunnions 43. In practice the socket opening 48 is tapered to the same draft as that of the projector leg 18 that is removeably entered therein. It will be seen that the from of projector P is thereby raised and lowered with freedom and inherent alignment of axis z normal thereto. The socket opening 48 is bottomless to ensure a tight fit with the projector leg 23.

Referring now to the roll adjustment support means Y, there is a flat horizontally disposed support pad 50 extending beneath the rear projector leg 20, and having a smooth surface upon which said leg 20 is slideably engaged when the projector is adjusted about axis z. Accordingly, the upwardly faced surface of pad 50 is carried by the spreader 35 and disposed arcuately about the axis z. Roll adjustment is by means of the support leg 20 threaded vertically into the housing of projector P, there being a thumb wheel 51 for its rotation and vertical displacement of the side of the projector oppoiste the roll axis y. In practice the pad 50 is molded of polyethelene which is self lubricating against the supported leg 20 of rubber or a like elastomer. It will be seen that the one side of projector P is thereby raised and lowered with freedom and with no restraint from its support upon the surface of pad 50.

Referring now to the yaw adjustment support means Z, there is a laterally shiftable socket 55 to turn the projector P about the axis z established by the front leg 23 supportably engaged in the socket opening 48. The socket 55 is slideably carried by the spreader 35, the spreader being arcuately formed about the yaw axis z. The projector leg 19 is fixed to the housing 10 thereof and the socket opening 56 is tapered to the same draft as that of the projector leg that is removeably entered therein. In accordance with this invention, the socket has a flat smooth bottom face 57 that slides upon a flat smooth face 58 of the spreader. The socket opening 56 is deeper than the penetration of leg 19 therein to ensure a tight fit with said projector leg. A feature is the loose relationship of the socket 55 captured in an approximate radial distance from axis z by a bail 58, and then precisely positioned laterally by an adjustment screw 59 threadedly engaged through the base of the socket. The screw 59 has a control knob 60 that bears upon an ear 61 carried by the spreader through an anti-friction washer. The knob 60 bears at one side of said ear 61, while an anti-backlash means in the form of a spring 62 secured over the screw 59 by a nut or nuts bears at the other side of ear 61 through an anti-friction washer. The screw 59 pushes and pulls the socket 55 laterally and about the axis z, whereby the projector P is revolved on the yaw axis z with little or no resistance from its support upon face 58 of the spreader.

Figure 1:
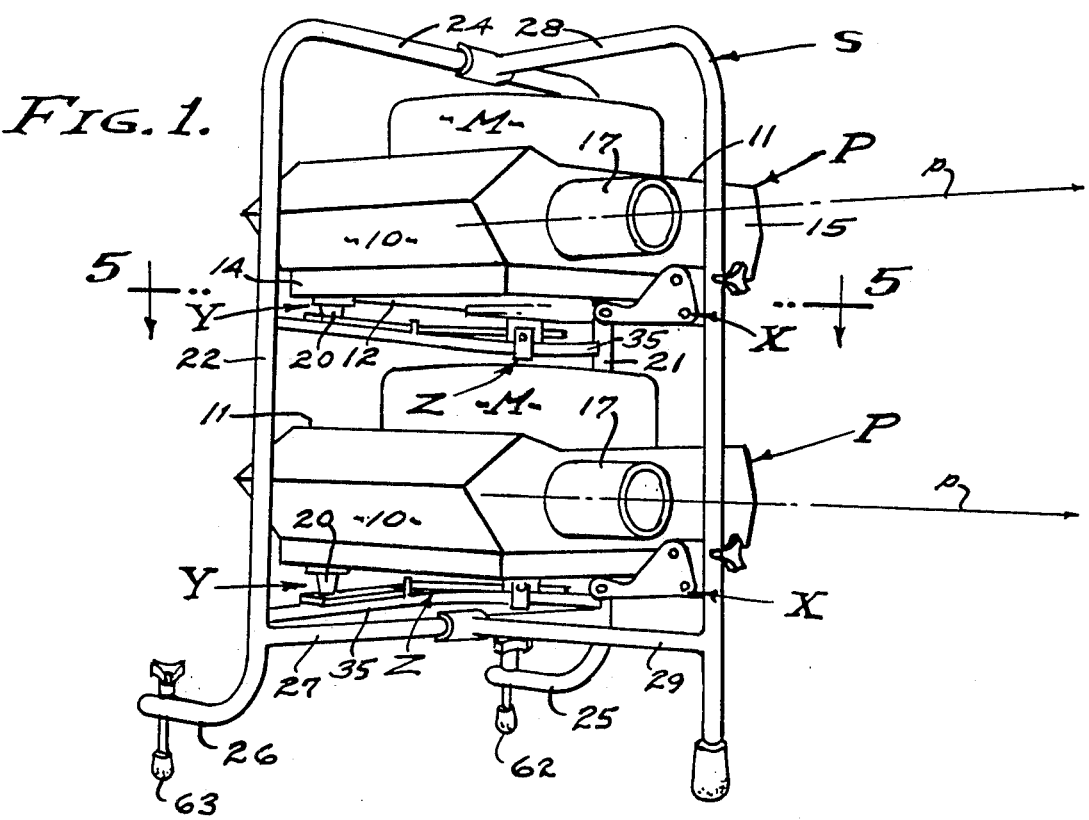
FIG. 1, is a perspective view of a stand of the present invention having two bays and a slide projector adjustably supported in each bay.
Figure 2:
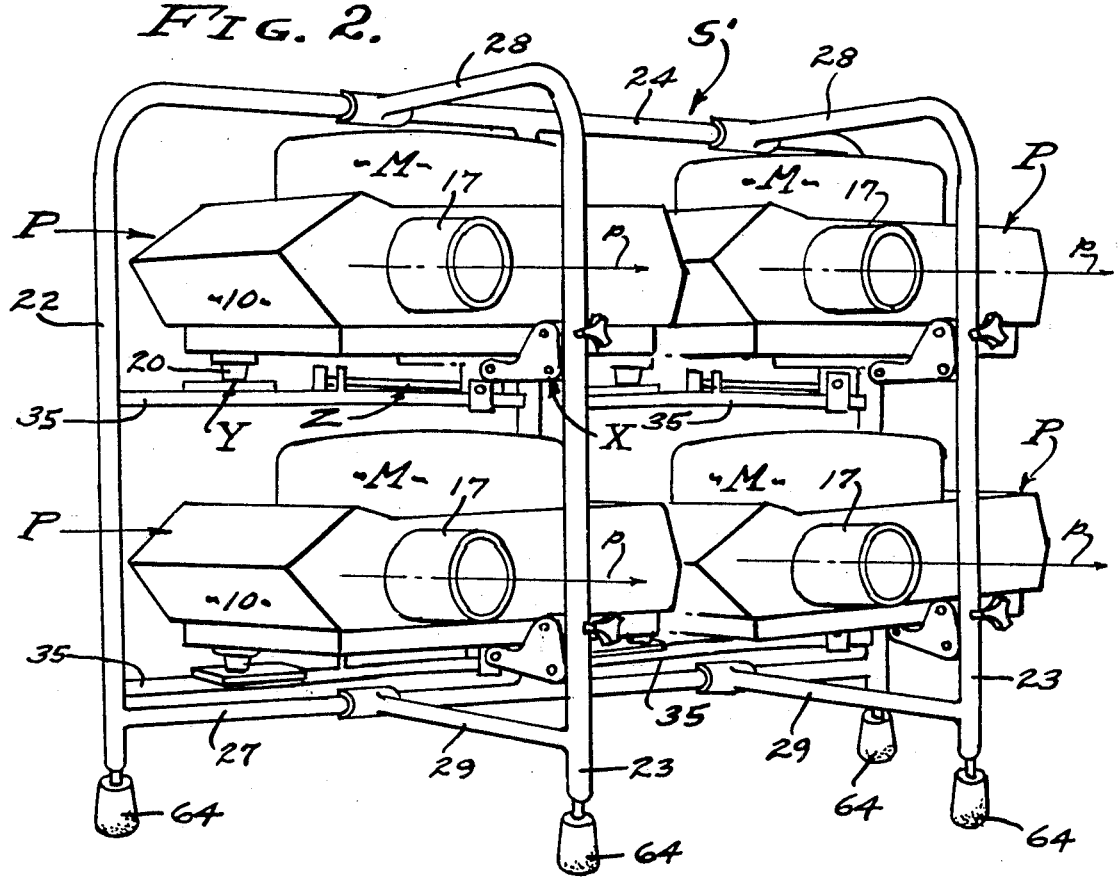
FIG. 2 is a perspective view of a stand of the present invention having four bays, in side by side pairs, and a slide projector adjustably supported in each bay.
Figure 6:
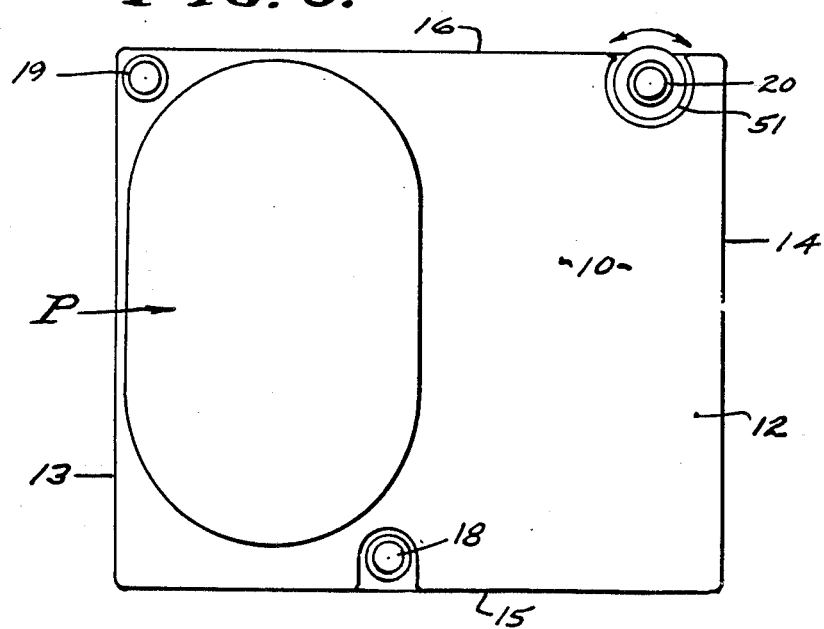
FIG. 6 is an enlarged bottom view of a projector removed from the stand.

From the foregoing it will be apparent that I have provided an extremely practical projector stand for the purposes referred to involving a multiplicity of projectors. In FIG. 1 of the drawings the stand is fabricated with two projector bays, one above the other; there can be one or two or more projector bays. In FIG. 2 of the drawings the stand is fabricated with side by side projector bays, one laterally adjacent the other, and the stand sharing a common center leg or column 61 to which the spreaders of next adjacent bays are fixed. There can be one or more pairs of adjacent projector bays, with at least two projectors side by side at each of one or more levels. In carrying out this invention, a stand or composite thereof has been made with thirty projector bays, side by side and one above the other; and this can be done as required. FIG. 3 illustrates the collapsed condition of a typical stand. Unison adjustment of all projectors is attained as in the FIG. 1 embodiment by providing the legs 21 and 22 with vertically adjustable feet 62 and 63 threadedly engaged through the heel portions 25 and 26 thereof. Likewise, the FIG. 2 embodiment is adjusted in unison by vertically adjustable feet 64 at each supporting leg 21-23. In practice, the vertically adjustable front leg of projector P (see FIG. 10) tends to be sloppy with respect to position of the yaw axis z; and accordingly means is provided to fit snugly with the housing 10 and in the form of a taper or cone 65 at the top of socket 55 that fits tightly with a horseshoe shaped recess 66 (see FIG. 6) in the bottom 12 of the projector housing 10. This yaw axis engagement will vary as the recess or other features of the projectors vary, the taper or cone adjusting to roll while remaining snugly engaged with the housing features.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A stand for at least one projector of the character described having a housing with a projection axis emanating from the front thereof, and having spaced side legs depending from a bottom thereof for support on a pitch axis, and having a leg spaced from the pitch axis and depending from the bottom for support on a roll axis extending therefrom to one of the side legs, and the other one of the side legs being vertically adjustable with respect to the housing for roll positioning of the projection axis, and including;

a pair of spaced vertically disposed side legs with a horizontal spreader rigid therewith and extending therebetween, and a vertically disposed leg spaced from said pair of legs and attached thereto by a strut extending therebetween, a pitch adjustment support means carried at the stand leg spaced from the pair of side legs thereof for support of said projector leg spaced from the pitch axis and for vertical adjustment thereof and positioning of the projection axis about said pitch axis, a roll adjustment support means carried by the spreader at one side leg of the stand for support through sliding engagement of the other one of the side legs of the projector for positioning of the projection axis about said roll axis, and a yaw adjustment support means carried by the spreader at the other side leg of the stand for transverse positioning of the first mentioned one leg of the projector and positioning of the projection axis about a yaw axis established by engagement of said one leg of the projector with the pitch adjustment support means.

2. A projector stand as set forth in claim 1, wherein a multiplicity of vertically spaced projector bays is established by vertically spaced horizontal spreaders rigid with the vertically disposed side legs of the stand, the leg spaced from said pair of legs being vertically coextensive with the side legs, and each projector bay including said pitch adjustment support means said roll adjustment support means and said yaw adjustment support means.

3. A projector stand as set forth in claim 1, wherein a multiplicity of laterally spaced projector bays is established by a common leg of the stand disposed vertically between laterally adjacent bays, and each projector bay including said pitch adjustment support means said roll adjustment support means and said yaw adjustment support means.

4. A projector stand as set forth in claim 1, wherein a multiplicity of vertically spaced projector bays is established by vertically spaced horizontal spreaders rigid with the vertically disposed side legs of the stand, the leg spaced from said pair of legs being vertically coextensive with the side legs, and by a common leg of the stand disposed vertically between laterally adjacent bays, and each projector bay including said pitch adjustment support means said roll adjustment support means and said yaw adjustment support means.

5. A projector stand as set forth in claim 2, wherein each of the pair of side legs of the stand is vertically adjustable by means engageable with a supporting surface, the leg spaced therefrom being directly engageable with said supporting surface, whereby the multiplicity of projectors is adjusted in unison with respect to pitch, roll and yaw.

6. A projector stand as set forth in claim 3, wherein means vertically adjusts each stand leg, whereby the multiplicity of projectors is adjusted in unison with respect to pitch, roll and yaw.

7. A projector stand as set forth in claim 4, wherein means vertically adjusts each stand leg, whereby the multiplicity of projectors is adjusted in unison with respect to pitch, roll and yaw.

8. A projector stand as set forth in claim 1, wherein the vertically disposed leg spaced from said pair of legs and attached thereto by a strut is moveably attached thereto and to lie thereagainst in a collapsed condition.

9. A projector stand as set forth in claim 1, wherein the vertically disposed leg spaced from said pair of legs and attached thereto by strut is removeably attached thereto and reattached thereto to lie thereagainst in a collaped condition.

10. A projector stand as set forth in claim 1, wherein the vertically disposed leg spaced from said pair of legs and is attached thereto is by a saddle on the strut and fastened to the horizontally diposed spreader, and releasable to lie refastened thereagainst in a collapsed condition.

11. A projector stand as set forth in claim 1, wherein the pitch adjustment support means includes a lever with a support arm to support the said projector leg spaced from the pitch axis, and an adjustment screw positioning the arm.

12. A projector stand as set forth in claim 1, wherein the pitch adjustment support means includes a first-class lever with a support arm to support the said projector leg spaced from the pitch axis, and a power arm operated by an adjustment screw positioning the same and the support arm integral therewith.

13. A projector stand as set forth in claim 1, wherein the pitch adjustment support means includes a socket to snugly receive and support the said projector leg spaced from the pitch axis.

14. A projector stand as set forth in claim 1, wherein the pitch adjustment support means includes a lever with a support arm to support the said projector leg spaced from the pitch axis, a socket to snugly receive and support the said projector leg, and an adjustment screw positioning the arm.

15. A projector stand as set forth in claim 1, wherein the pitch adjustment support means includes a first-class lever with a support to support the said projector leg spaced from the pitch axis, a socket to snugly receive and support the said projector leg, and a power arm operated by an adjustment screw positioning the same and the support arm integral therewith.

16. A projector stand as set forth in claim 1, wherein the pitch adjustment support means includes a lever with a support arm to support the said projector leg spaced from the pitch axis, a socket pivotally carried on a transverse axis by the support arm to snugly receive and support the said projector leg, and an adjustment screw positioning the arm.

17. A projector stand as set forth in claim 1, wherein the pitch adjustment support means includes a first-class lever with a support to support the said projector leg spaced from the pitch axis, a socket pivotally carried on a transverse axis by the support arm to snugly receive and support the said projector leg, and a power arm operated by an adjustment screw positioning the same and the support arm integral therewith.

18. A projector stand as set forth in claim 1, wherein the pitch adjustment support means includes a lever with a support arm to support the said projector leg spaced from the pitch axis, a socket pivotally carried on a transverse axis by the support arm to receive the said projector leg and having an upwardly projecting cone snugly engageable in a recess of the projector housing, and an adjustment screw positioning the arm.

19. A projector stand as set forth in claim 1, wherein the roll adjustment support means includes a flat and smooth horizontal surface carried by the spreader for sliding engagement with the said other one of and the vertically adjustable side leg of the projector.

20. A projector stand as set forth in claim 1, wherein the roll adjustment support means includes a pad having a flat and smooth top surface disposed horizontally and arcuately about the yaw axis for sliding engagement with the said other one of and the vertically adjustable side leg of the projector.

21. A projector stand as set forth in claim 1, wherein the roll adjustment support means includes a pad of polypropylene having a flat and smooth horizontally disposed top surface and carried by the spreader for sliding engagement with the said other one of and the vertically adjustable side leg of the projector, said side leg of the projector being of rubber-elastomer.

22. A projector stand as set forth in claim 1, wherein the yaw adjustment support means includes a socket slideable arcuately upon the spreader about the yaw axis for snugly receiving one of the side legs of the projector, and an adjustment screw positioning the socket about said yaw axis.

23. A projector stand as set forth in claim 1, wherein the yaw adjustment support means includes a socket slideable arcuately upon the spreader about the yaw axis for having a tapered opening snugly receiving one of the side legs of the projector, and an adjustment screw positioning the socket about said yaw axis.

24. A projector stand as set forth in claim 1, wherein the yaw adjustment support means includes a socket slideable arcuately upon the spreader about the yaw axis, means capturing the socket to the spreader for free movement therealong, the socket snugly receiving one of the side legs of the projector, and an adjustment screw positioning the socket about said yaw axis.

25. A projector stand as set forth in claim 1, wherein the yaw adjustment support means includes a socket slideable arcuately upon the spreader about the yaw axis, a bail embracing the spreader and capturing the socket for free movement supported upon the spreader, the socket having a tapered opening snugly receiving one of the side legs of the projector, and an adjustment screw positioning the socket along the spreader and about said yaw axis.

26. A stand for a multiplicity of projectors of the character described having a housing with a projection axis emanating from the front thereof, and having spaced side legs depending from a bottom thereof for support on a pitch axis, and having a leg spaced from the pitch axis and depending from the bottom for support on a roll axis extending therefrom to one of the side legs, and the other one of the side legs being vertically adjustable with respect to the housing for roll positioning of the projection axis, and including;

a pair of spaced vertically disposed side legs with a horizontal spreader rigid therewith and extending therebetween, and a vertically disposed leg spaced from said pair of legs and attached thereto by a strut extending therebetween, and a multiplicity of vertically spaced projector bays established by vertically spaced horizontal spreaders rigid with the vertically disposed side legs of the stand, the leg spaced from said pair of legs being vertically coextensive with the side legs, and each projector bay including a pitch adjustment support means a roll adjustment support means and a yaw adjustment support means, the pitch adjustment support means being carried at the stand leg spaced from the pair of side legs thereof for support of said projector leg spaced from the pitch axis and for vertical adjustment thereof and positioning of the projection axis about said pitch axis, and the pitch adjustment support means including a lever with a support arm to support the said projector leg spaced from the pitch axis, and an adjustment screw positioning the arm, the roll adjustment support means being carried by the spreader at one side leg of the stand for support through sliding engagement of the other one of the side legs of the projector for positioning of the projection axis about said roll axis, and the roll adjustment support means including a flat and smooth horizontal surface carried by the spreader for sliding engagement with the said other one of and the vertically adjustable side leg of the projector, and the yaw adjustment support means being carried by the spreader at the other side leg of the stand for transverse positioning of the first mentioned one leg of the projector and positioning of the projection axis about a yaw axis established by engagement of said one leg of the projector with the pitch adjustment support means, and the yaw adjustment support means including a socket slideable arcuately upon the spreader about the yaw axis and snugly receiving the first mentioned leg of the projector, and an adjustment screw positioning the socket about said yaw axis.

* * * * *